W. E. FISCHER.
Machine for Turning Channel Flaps for Boots and Shoes.
No. 9,372. Reissued Sept. 7, 1880.
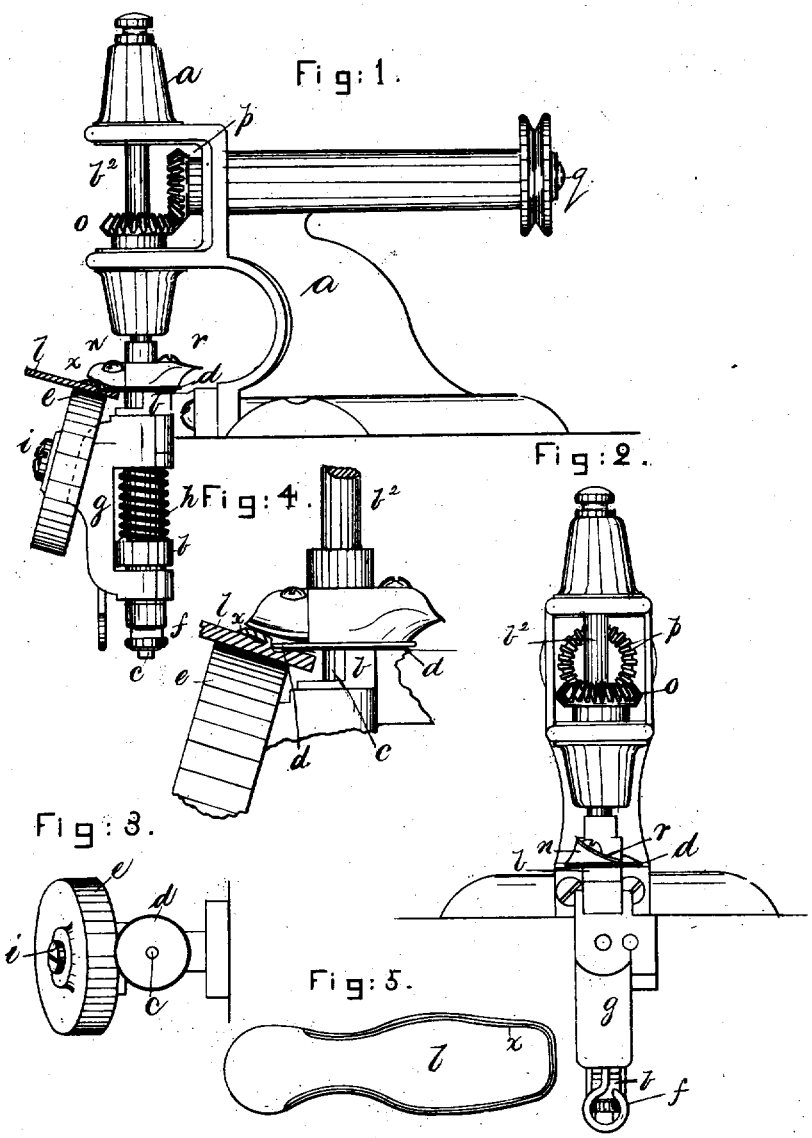
Witnesses:
N. E. Whitney
Arthur Reynolds.
Inventor:
William E. Fischer,
by Crosby & Gregory,
Attys.
THE NORRIS PETERS CO., WASHINGTON, D. C.

UNITED STATES PATENT OFFICE.

WILLIAM E. FISCHER, OF BOSTON, MASSACHUSETTS

MACHINE FOR TURNING CHANNEL-FLAPS FOR BOOTS AND SHOES.

SPECIFICATION forming part of Reissued Letters Patent No. 9,372, dated September 7, 1880.

Original No. 128,610, dated July 2, 1872. Application for reissue filed August 7, 1880.

*To all whom it may concern:*

Be it known that I, WILLIAM E. FISCHER, of Boston, in the county of Suffolk and State of Massachusetts, have invented an Improvement in Turning Channel-Flaps of Boot and Shoe Soles; and I do hereby declare that the following, taken in connection with the drawings which accompany and form part of this specification, is a description of my invention sufficient to enable those skilled in the art to practice it.

In the manufacture of that class of boots and shoes in which the soles are united to the uppers or vamps by fastenings inserted from the outer finished surface of the sole it is customary to use channeled soles, a flap being formed in channeling, which flap is turned or wiped over backward and pressed down, so as to leave the channel open for reception of the fastenings, the flap being turned back again to its first position after the soles and vamp are united.

The flaps are generally bent over and pressed down by hand, requiring much labor and being not very quickly or perfectly accomplished.

The object of my invention is to produce a machine to automatically raise and wipe or turn over backward and press down the flap of a channeled sole instead of doing it by hand, as has always been the case before this my invention.

A channeled sole operated upon by this my machine has its channel properly opened for the reception of the sole-fastenings.

My invention consists, essentially, in an organized machine for turning backward and pressing the flap of the sole.

In the practice of my invention I employ a guide or holder at the end of an upright shaft, the said guide bearing upon and holding the channeled soles against the sole or work supporting roller or wheel while the flap is acted upon by a wiper that wipes or turns the flap over backward upon the sole and presses it down closely thereon.

Figure 1 shows in side elevation a sufficient portion of a channel-flap-turning machine to illustrate my invention; Fig. 2, a front elevation thereof, the sole-support being omitted; Fig. 3, a detail shewing the sole-supporting wheel and guide or holder; Fig. 4, a detail on a larger scale illustrating the parts which bear against the sole while its channel-flap is being wiped or turned back; and Fig. 5 represents a face view and section of the sole with its channel-flap turned back.

The frame-work *a*, of suitable shape, has proper bearings *b* to receive the shaft or stud *c*, provided at its upper end with the guide or holder *d*, made of thin metal and of sufficient size to adapt its edge to extend under the flap equal to the depth of the knife-cut and also operate upon the sole under the flap near its outer edge, thus aiding in keeping it in place on the sole-support *e*. This shaft or stud *c* is so placed in its bearings as to be free to turn, and the guide or holder *d* may be adjusted as to its height or position with relation to the wiper *n* by means of a suitable nut and collar, *f*, screwed upon the screw-threaded end of the said stud.

The sole-supporting surface *e*, made as a wheel, is mounted upon an axle, *i*, extended from the slide *g*, supported by the spiral spring *h*, the said slide being free to yield or descend to enable the sole-support to accommodate itself to any inequalities in the thickness of the material of the sole. This axis or stud for the sole-support is so located that a line drawn longitudinally through its center would so intersect a like line drawn through the center of the wiper-carrying shaft $b^2$ as to form an acute angle. This inclination of the acting face of the support *e* enables the guide and wiper to the more readily enter the channel cut slanting into the sole and to lift and press the flap back on the sole.

The edge of the sole (see Figs. 1 and 4) is entered between the support and guide *d*. Above the guide is located the wiper or flap-turner *n*, made as a disk or wheel provided with detachable blades *r*, set in an inclined position, and so formed as to act upon and wipe or bend the flap *x* over backward, as in Figs. 1, 4, and 5, and press it down firmly against the sole, where it rests, leaving the channel uncovered to receive the sole-fastenings.

The wiper is attached to the lower end of a vertical shaft, $b^2$, provided with a bevel-gear, *p*, on a rotating shaft, *q*, sustained in suitable bearings in the frame-work.

The guide or holder and sole-support either or both may be rotated positively to feed the sole; but I prefer to move the sole and draw it through the machine by hand.

I claim—

1. In an organized machine to turn back a channel-flap, a support for the sole and a wiper to act upon and wipe or turn back and press the channel-flap upon the sole to open and prepare the channel of the channeled sole for the reception of sole-fastenings.

2. In combination, the sole-support and guide or holder to bear upon the channeled side of the sole and pass under the channel-flap, and a rotary wiper to wipe or turn the channel-flap over backward and press it down upon the face of the sole at the rear of the channel.

3. In an organized machine for turning back a channel-flap of a sole, a guide to enter the channel below the flap, combined with the wiper to act upon and turn back the flap, substantially as described.

4. The rotating wiper provided with inclined blades, and the yielding sole-support, combined with guide to extend into the channel under the flap, and with means, substantially as described, to adjust the guide vertically with relation to the wiper, as set forth.

5. In a machine to turn back a channel-flap, a rotating sole-support having its supporting-face inclined with relation to the axis of the wiper-shaft, as shown, and for the purpose described.

WILLIAM E. FISCHER.

Witnesses:

G. W. GREGORY,

N. E. C. WHITNEY.